(12) United States Patent
Groves et al.

(10) Patent No.: US 9,131,639 B1
(45) Date of Patent: Sep. 15, 2015

(54) WEED EATER SUPPORT DEVICE

(71) Applicants: Oliver James Groves, Freeland, WA (US); Maxine L. Groves, Freeland, WA (US)

(72) Inventors: Oliver James Groves, Freeland, WA (US); Maxine L. Groves, Freeland, WA (US)

( * ) Notice: Subject to any disclaimer, the term of this patent is extended or adjusted under 35 U.S.C. 154(b) by 244 days.

(21) Appl. No.: 13/846,847

(22) Filed: Mar. 18, 2013

Related U.S. Application Data

(60) Provisional application No. 61/611,597, filed on Mar. 16, 2012.

(51) Int. Cl.
*A01D 34/416* (2006.01)
*A01D 34/84* (2006.01)

(52) U.S. Cl.
CPC .............. *A01D 34/416* (2013.01); *A01D 34/84* (2013.01)

(58) Field of Classification Search
CPC .............. A01D 34/001; A01D 34/416; A01D 34/4167; A01D 2101/00
USPC .................................................. 56/12.7, 16.7
See application file for complete search history.

(56) References Cited

U.S. PATENT DOCUMENTS

| | | | | |
|---|---|---|---|---|
| 4,704,849 | A * | 11/1987 | Gilbert et al. | 56/17.5 |
| 4,922,694 | A * | 5/1990 | Emoto | 56/16.7 |
| 5,092,112 | A * | 3/1992 | Buckendorf, Jr. | 56/17.5 |
| 5,317,807 | A * | 6/1994 | Pulley | 30/296.1 |
| 5,450,715 | A * | 9/1995 | Murray | 56/16.9 |
| 5,459,985 | A * | 10/1995 | Gedert | 56/17.2 |
| 5,477,665 | A * | 12/1995 | Stout | 56/16.7 |
| 5,613,354 | A * | 3/1997 | Foster | 56/16.7 |
| 5,970,692 | A * | 10/1999 | Foster | 56/12.1 |
| 6,745,549 | B1 * | 6/2004 | Taylor | 56/12.7 |
| 7,036,297 | B2 * | 5/2006 | Popp | 56/12.7 |
| 2003/0221400 | A1 * | 12/2003 | Gallentine | 56/12.7 |
| 2008/0202088 | A1 * | 8/2008 | Angelle | 56/12.7 |

* cited by examiner

*Primary Examiner* — Thomas B Will
*Assistant Examiner* — Mai Nguyen
(74) *Attorney, Agent, or Firm* — Michael D. Eisenberg

(57) ABSTRACT

A device for supporting a weed eater is provided. The device comprises a grasping unit, a central body, a lower support unit, and at least one wheel. The grasping unit is configured for grasping a shaft of the weed eater. The central body has an upper hand and a lower end, the upper end being joined to the grasping unit. The lower support unit is joined to the lower end of the central body. The at least one wheel is joined to the lower support unit and configured for supporting the lower support unit.

13 Claims, 10 Drawing Sheets

WEED EATER SUPPORT DEVICE

CROSS-REFERENCES TO RELATED APPLICATIONS

The present application claims priority from U.S. Provisional Application Ser. No. 61/611,597 filed on Mar. 16, 2012, which is hereby incorporated herein by reference in its entirety.

TECHNICAL FIELD

The present invention, in some embodiments thereof, relates to garden tools, and more specifically to devices for cutting weeds, grass, brushes, and hedges.

BACKGROUND OF THE INVENTION

A weed eater is an electrically-powered or gas-powered handheld device for cutting grass and other plants. It consists of a cutting head at the end of a long shaft with a handle or handles and sometimes a shoulder strap. The cutting head is generally a flexible monofilament, but may be replaced by a plastic or metal blade, a chain saw, or a hedge trimmer, for example.

Generally, a weed eater is carried by a user via a shoulder strap. The shoulder strap has two ends joined to the weed eater's shaft, and is designed for being strapped around the user's shoulder. Thus, the weed eater's weight is supported by the user's shoulder.

BRIEF SUMMARY OF EMBODIMENTS OF THE INVENTION

The inventor has found that some users may find it difficult to operate the weed eater while supporting the weed eater's weight. For example, it may difficult to pull the cord to start up the weed eater while the weight of the machine is upheld by the user's shoulder. Furthermore, it may be difficult for a user to cut weeds with a sweeping motion while the weed eater's weight bears down on the user's shoulder. There is therefore a need in the art to have a device which allows the user to operate the weed eater, without requiring to the user to bear the weed eater's weight.

The present invention fulfills this need by providing a supporting device having a first end designed to be joined to the weed eater's shaft and a second end sporting wheels and touching the ground. This device therefore supports the weight of the weed eater and enables the user to push, pull, and rotate the weed eater in order to direct the weed eater to a desired location.

Therefore, an aspect of some embodiments of the present invention relates to a device for supporting a weed eater. The device comprises a grasping unit, a central body, a lower support unit, and at least one wheel. The grasping unit is configured for grasping a shaft of the weed eater. The central body has an upper hand and a lower end, the upper end being joined to the grasping unit. The lower support unit is joined to the lower end of the central body. The at least one wheel is joined to the lower support unit and configured for supporting the lower support unit.

Optionally, the grasping unit is removably joinable to the shaft of the weed eater.

In a variant, at least a portion of the grasping unit is slidable along the shaft of the weed eater.

In another variant, the device further comprises a locking mechanism configured for being engaged for preventing the at least one portion of the grasping unit from sliding along the shaft, and for being disengaged for enabling the at least one portion of the grasping unit to slide along the shaft.

In yet another variant, the grasping unit is rotatable with respect to the central body, thereby changing an orientation of the grasping unit with respect to a ground upon which the device is located.

In a further variant, the lower support unit is translatable along the central body, thereby enabling adjustment of a height of the device.

In yet a further variant, the lower support unit comprises: a support bracket joined to the lower end of the main body; and a swivel caster joined to the at least one wheel, the swivel caster being configured for enabling a rotation of the at least one wheel around a rotation axis substantially perpendicular to a ground upon which the at least one wheel is located.

In a variant, the support bracket comprises a hollow tube, for receiving the central body's lower end, the central body being telescopically movable within the tube along the tube's central axis.

Optionally, the hollow tube has at least one aperture arranged along a long axis of the hollow tube, and the central body as at least one aperture arranged along a long axis of the central body. The device may further comprise a pin usable for preventing translation of the central body with respect to the support bracket, by being inserted to traverse a desired aperture of the hollow tube and a desired aperture of the central body, when the desired aperture of the hollow tube and the desired aperture of the central body are aligned.

In another variant, the grasping unit comprises a first grasper, for grasping the weed eater's shaft, and a flange joined to the first grasper and extending toward the main body.

The flange may comprise a rotation pin configured for traversing an upper aperture on the central body, to enable rotation of the grasping unit with respect to the main body about the rotation pin.

Optionally, the flange has a cog-like shape with a plurality of teeth. The main body may have an intermediate aperture located between the upper aperture and the main body's lower end, and aligned with the teeth of the flange. The device may comprise a locking support pin, configured for: being engaged to prevent rotation between the flange and the main body, by being inserted in the main body's intermediate aperture and extending out of the intermediate aperture to be caught between a desired pair of teeth of the flange; and being disengaged to enable rotation between the flange and the main body.

In yet another variant, the main body is in a form of a rod extending from the main body's lower end to the main body's upper end; the intermediate aperture has an elongated shape, traverses the rod around an axis perpendicular to a long axis of the rod, extends along the long axis of the rod, and is traversed by the lock supporting pin; the device comprises a spring joined to the rod and to the locking support pin, such that a compression or extension of the spring moves locking support pin within the elongated aperture along the rod's long axis.

In a further variant, the flange is an H-bracket comprising a base and two side panels flanking the base and facing each other.

In yet a further variant, the first grasper is held on the base between the H-bracket's sides, and comprises a clamp, a rack, and a sliding pad. The clamp comprises a lower clamp side and an upper clamp side, the upper and lower clamp side being configured to be joined for grasping the weed eater's shaft. The rack is located on an upper surface of the upper clamp side. The sliding pad, joined to the base of the H-bracket and extending parallel to the rack. The lower clamp side is joined to the sliding pad, and is translatable along the sliding pad in a direction parallel to a long axis of the weed eater's shaft.

Optionally, the H-bracket comprises a gear engaging the first grasper's rack to form a rack-and-pinion assembly, the gear being located between the side panels of the H-bracket; and a cog joined to the gear, and configured for controlling a rotation of the gear. The rotation of the gear causes the rack to move, thereby moving the clamp along the sliding pad.

In a variant, the device further comprises a second grasper, a second flange, a clevis, and a hinge. The second grasper is configured for grasping the weed eater's shaft between the first grasper and the weed eater's blade. The second flange extends toward the main body along a side of the second grasper. The clevis is joined to the second flange via a second rotation pin, and is rotatable with respect to the second flange about the second rotation pin, such that in an open mode of the device the clevis touches the main body to prevent the main body from rotating with respect to the shaft, and in a closed mode of the device the clevis is substantially parallel to the weed eater's shaft. The hinge is joined to the clevis via third rotation pin and is rotatable with respect to the clevis, such that in an open mode of the device the clevis touches the weed eater's shaft to prevent the clevis from rotating toward the shaft, while in a closed mode of the device, the hinge is substantially parallel to the weed eater's shaft.

Optionally, the flange comprises a rotation pin configured for traversing an upper aperture on the central body, to enable rotation of the grasping unit with respect to the main body about the rotation pin, and the second rotation pin and the third rotation pin are parallel the rotation pin.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 1:
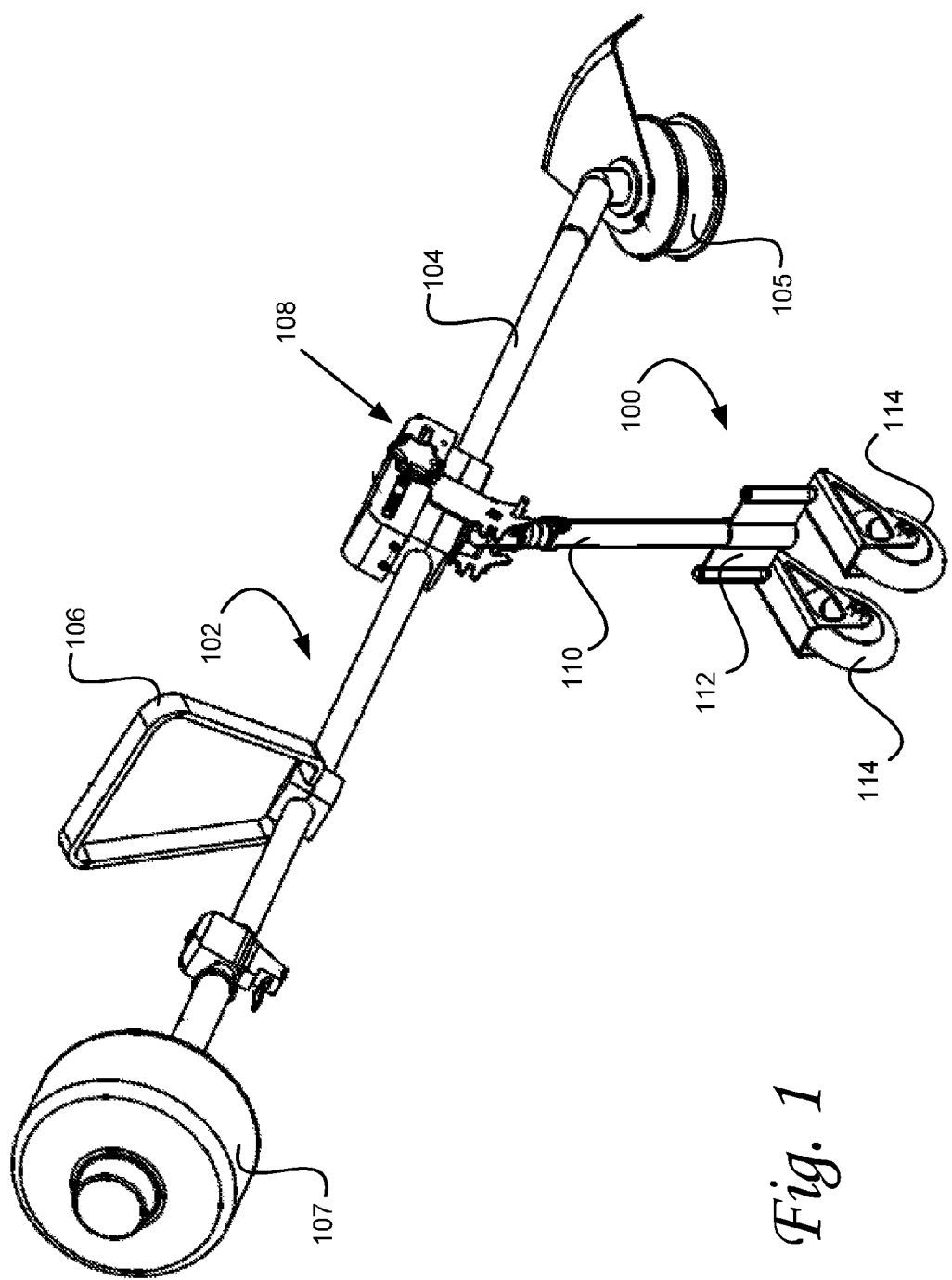
FIG. 1 is a perspective drawings illustrating a supporting device of the present invention, joined to a weed eater.

Referring now to the drawings, FIG. 1 is a perspective drawing illustrating a supporting device 100 of the present invention, joined to a weed eater 102.

The weed eater 102 is a weed eater as known in the art, and includes, a shaft 104, a blade 105 at a first end of the shaft, a motor 107 at a second end of the shaft, and a handle 106 joined to the shaft between the blade and the motor. The supporting device 100 includes a grasping unit 108, a central body 110, a lower support unit 112, and one or more wheels 114.

The grasping unit 108 is configured for grasping the shaft 104 of the weed eater 102. The grasping unit 108 is joined to the central body 110 on a first side of the central body 110. On a second side of the central body 110, the central body 110 is joined to the lower support unit 112. The lower support unit 112 rests on and is supported by one or more wheels 114.

As can be seen from the drawings, most of the weight of the weed eater is supported by the supporting device 100, and the user may guide the weed eater 102 by applying a force on the handle 106 of the weed eater. The one or more wheels 114 decrease the user's effort in guiding the weed eater 102.

In a variant, the grasping unit 108 is removably joined to the shaft 104. In this manner, the user may join the grasping unit to any section of the shaft. In another variant, at least a portion of the grasping unit 108 is slidable along the shaft 104, and may include a locking mechanism configured for being engaged to lock the grasping unit 108 to the shaft 104 in order to prevent the at least one portion of grasping unit from sliding along the shaft, once the grasping unit is located at a desired location along the shaft, and for being disengaged for enabling the at least one portion of the grasping unit to slide along the shaft.

Optionally, the central body 110 is a rod. In a variant, the central body 110 and grasping unit 108 are rotatable with respect to each other, thereby enabling adjustment of the orientation of the grasping unit (and thus of the weed eater's shaft) with respect to the ground upon which the device 100 stands. In a variant, the lower support unit 112 and the central body 110 can be translated along each other (e.g., telescopically), thus enabling the user to adjust the height of the support device 100. In FIG. 1, the support device 100 is shown to include two wheels 114. This is not a necessary feature, and the scope of the present invention extends to a support device having any number of wheels.

Figure 2:
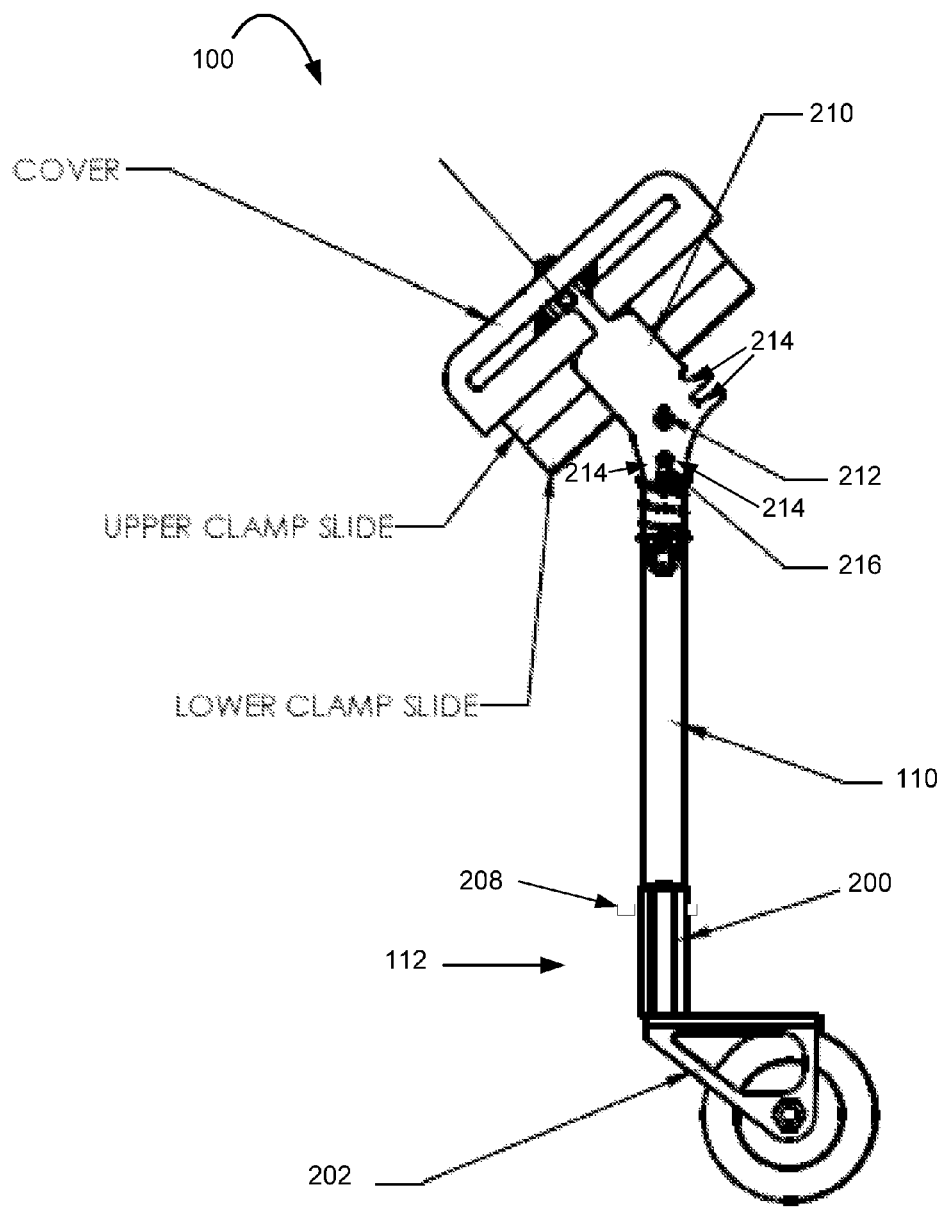
FIG. 2 is a drawing illustrating side view of an example of a supporting device of the present invention.
Figure 3:
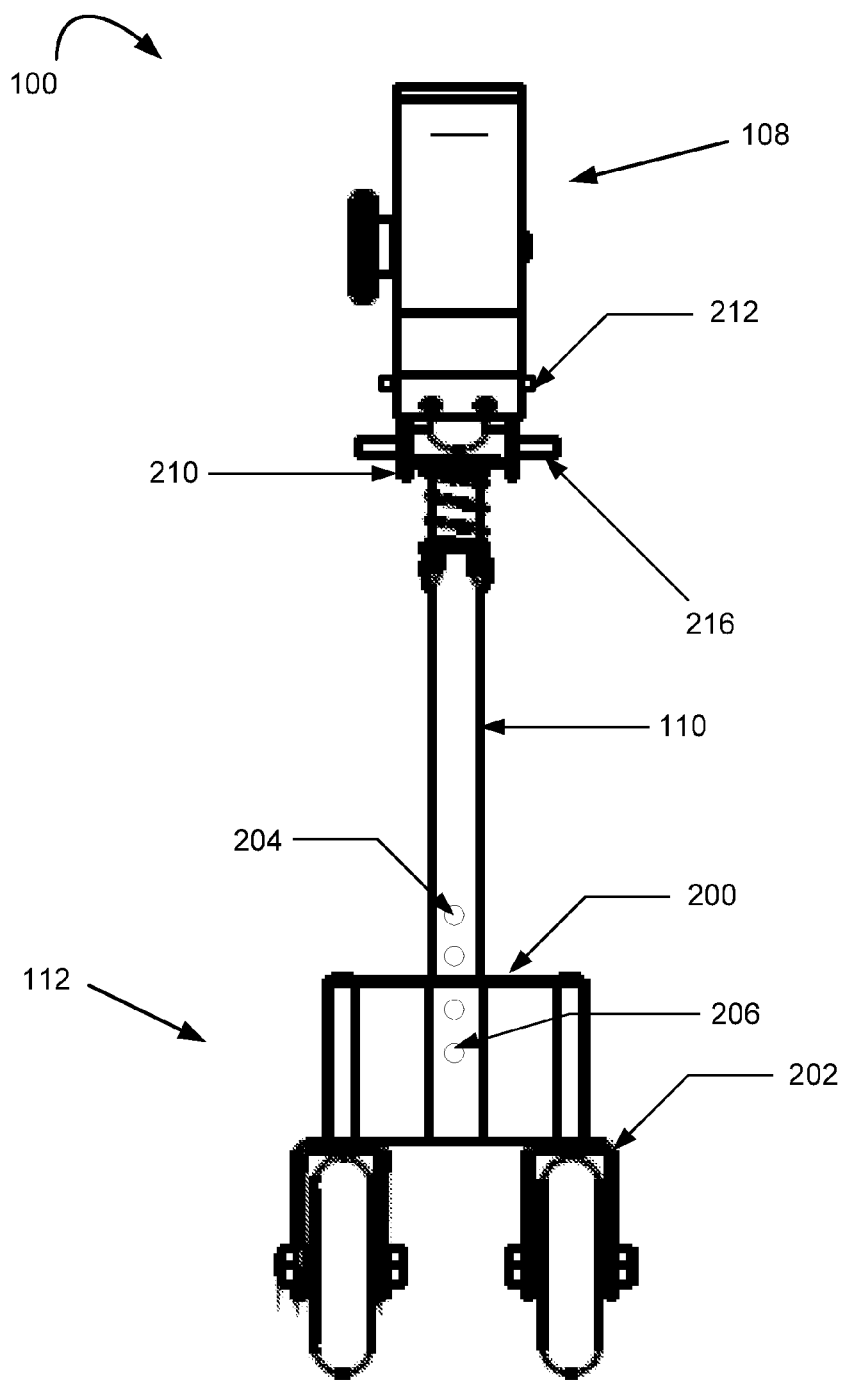
FIG. 3 is a front view of the supporting device of FIG. 2.
Figure 4:
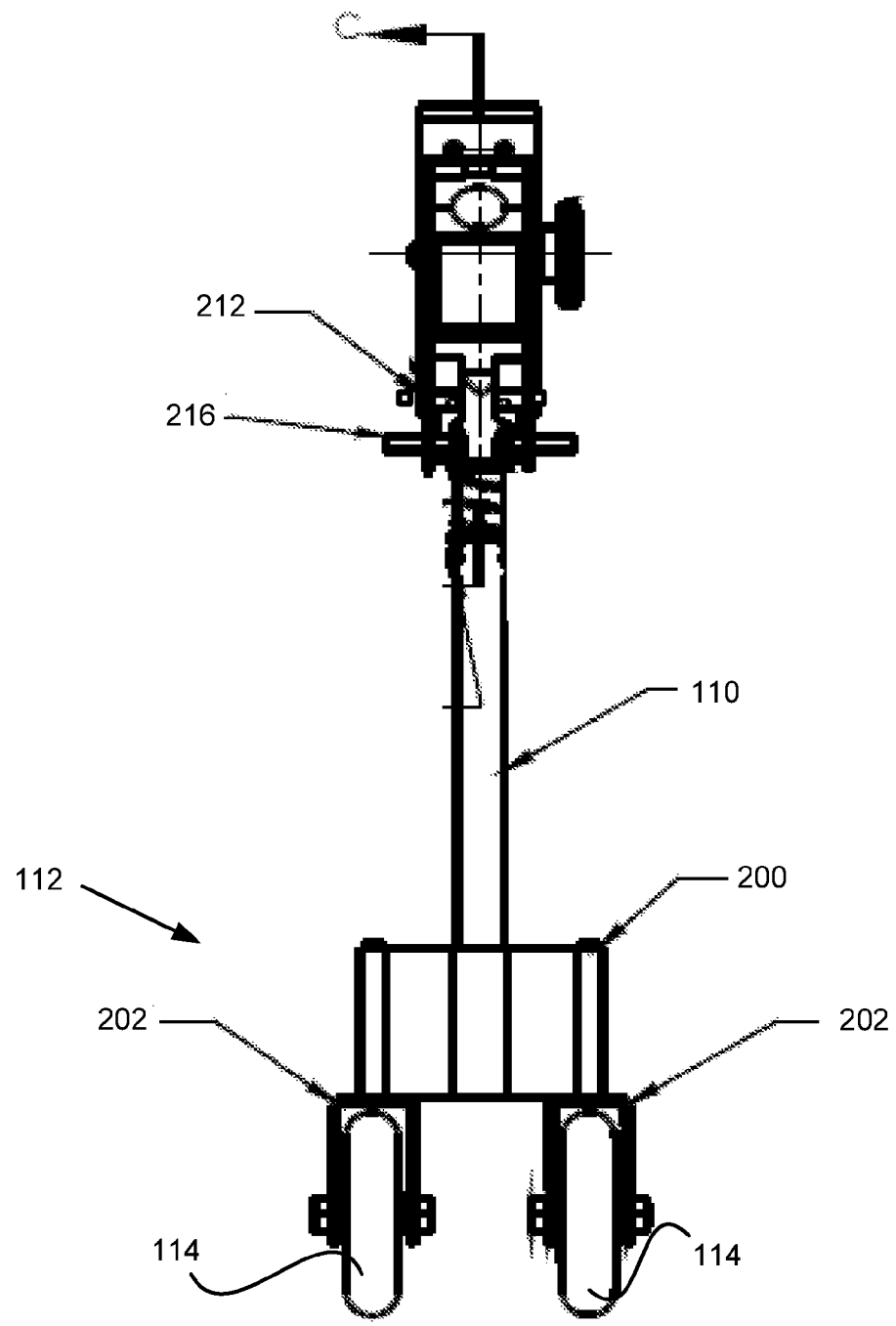
FIG. 4 is a back view of the supporting device of FIG. 2.

Reference is now made to FIGS. 2 to 4. FIG. 2 is a side view of an example of a supporting device of the present invention. FIG. 3 is a front view of the supporting device of FIG. 2. FIG. 4 is a back view of the supporting device of FIG. 2.

In a variant, the lower support 112 includes a support bracket 200 and a swivel caster assembly 202. The support bracket is joined to the swivel caster assembly 202, which is in turn joined to one or more wheels 114. The swivel caster assembly 202 enables a rotation of the wheels around a vertical axis (a rotation axis substantially perpendicular to the ground upon which the wheels are located), thus enabling the orientation of the wheels to be changed.

The support bracket 200 of the lower support 112 is joined to the central body 110, which may be in the form of a rod. Optionally, the lower end of the central body 110 is inserted into a hollow tube of the support bracket, and may be telescopically movable within the tube along the tube's central axis, to enable adjustment of the height of the device 100. A locking mechanism may be present to prevent translation of the central body 110 with respect to the support bracket 200, when a desired height of the device 100 has been reached. Optionally, the central body 110 may include one or more apertures 204 arranged along a long (vertical) axis of the central body, and the hollow tube of the support bracket includes one or more apertures 206 arranged along a long (vertical) axis of the tube. When one of the apertures 204 is aligned with one of the apertures 206, a pin 208 may form the locking mechanism. The pin 208 may be inserted through the aligned apertures, to prevent translation of the central body 110 with respect to the support bracket 200.

As mentioned above, the grasping unit 108 may be rotatable with respect to the central body 110 around an axis perpendicular to the long axis of the central body, to enable adjustment of the orientation of the weed eater. In the example of FIGS. 2 to 4, the grasping unit 108 includes a flange 210 extending away from one or two sides of the grasping unit 108 toward the main body 110. The flange 210 may be in the form of an H-bracket. The flange 210 is joined to the central body 110 via a rotation pin 212, which traverses the central body 110 via an upper aperture thereof and is joined to flange 210, to enable rotation of the flange (and therefore of the grasping unit) with respect to the central body 110 around an axis perpendicular to the long axis of the central body 110.

In a variant, the flange is shaped like a cog having a plurality of teeth 214. The main body 110 has an intermediate aperture (not pictured) in the vicinity of the flange, below the upper aperture (i.e., between the upper aperture and main body's lower end), the upper aperture being traversable by a locking support pin 216. When engaged, the locking support pin 216 traverses the intermediate aperture and extends horizontally away from the main body 110, so as to be caught between the teeth 214 of the cog-like flange 210. In this manner, when engaged, the locking support pin 216 prevents rotation between the flange and main body, thereby setting the orientation of the grasping unit 108 (and thus of the weed eater's shaft) with respect to the main body 110. It should be noted that this configuration also enables the user to set main body 110 to be parallel and adjacent to the weed eater's shaft, in order to store the device 100 and weed eater 102 assembly, while minimizing the space taken up by the assembly. Optionally, in order to change the orientation of the H-bracket, the locking support pin 216 is removed (disengaged), the flange is rotated so that a space between a desired pair of teeth 214 is aligned with the intermediate aperture of the main body, and the locking pin 216 is reinserted into the intermediate aperture while passing between the desired pair of teeth. A structure which enables changing the orientation of the flange without removing the locking pin 216 will be presented below, in the description of FIGS. 5 and 6.

It should be noted that in the example of FIGS. 2 to 4, the locking support pin 216 is shown to protrude through both sides of the intermediate aperture, and the flange is shown to have two cog-like sides, each extending away from a respective side of the clasping unit 108, and facing a respective end of the intermediate aperture of the main body. This is not necessary. In fact, the intermediate aperture may traverse only a section of the main body, and/or the locking support pin 216 may protrude through one side of the intermediate aperture. In such a case, the flange may have one cog-like side for holding the locking support pin 216.

Figure 5:
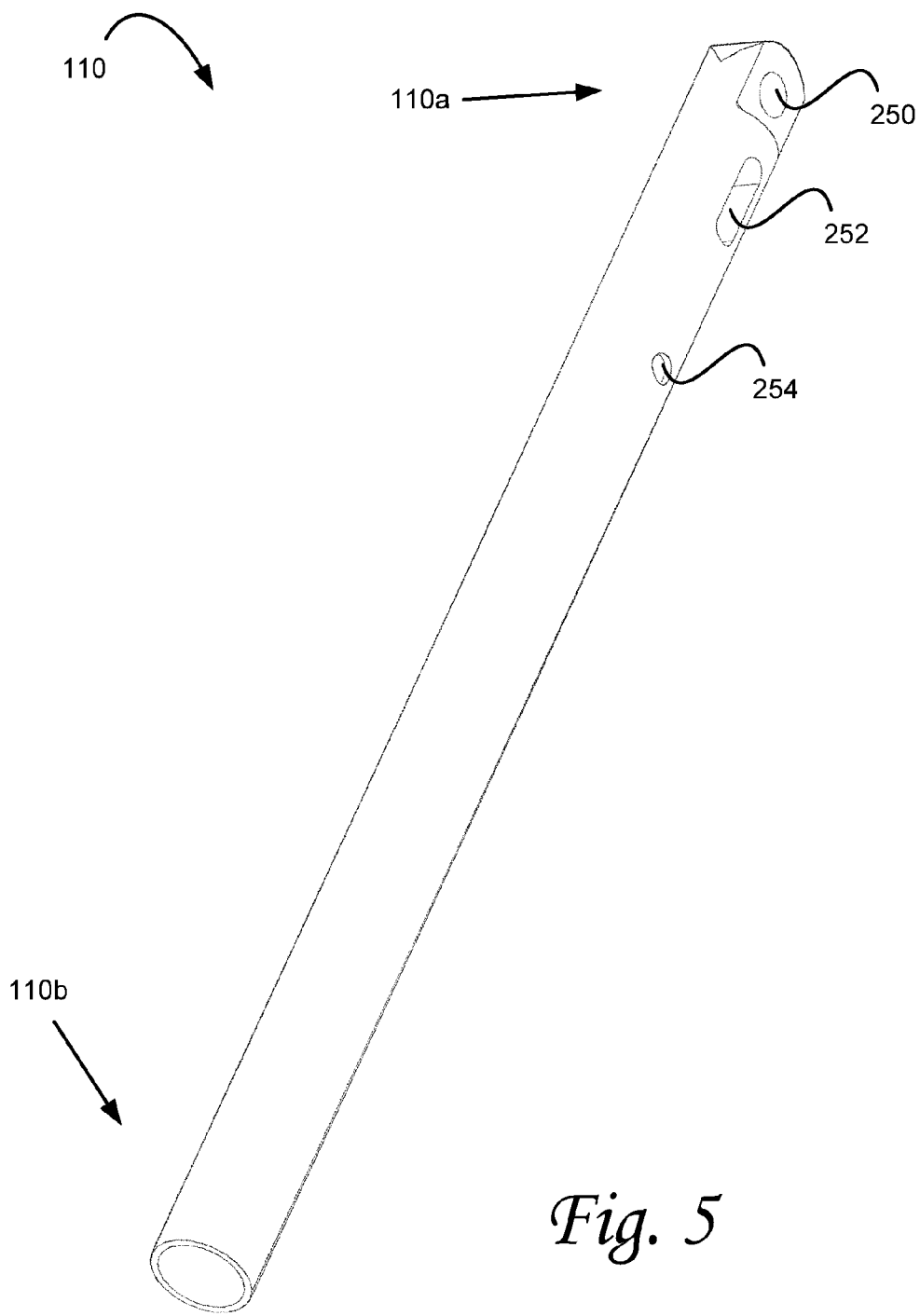
FIG. 5 is a perspective drawing illustrating an example of a central body of the supporting device, according to some embodiments of the present invention.
Figure 6:
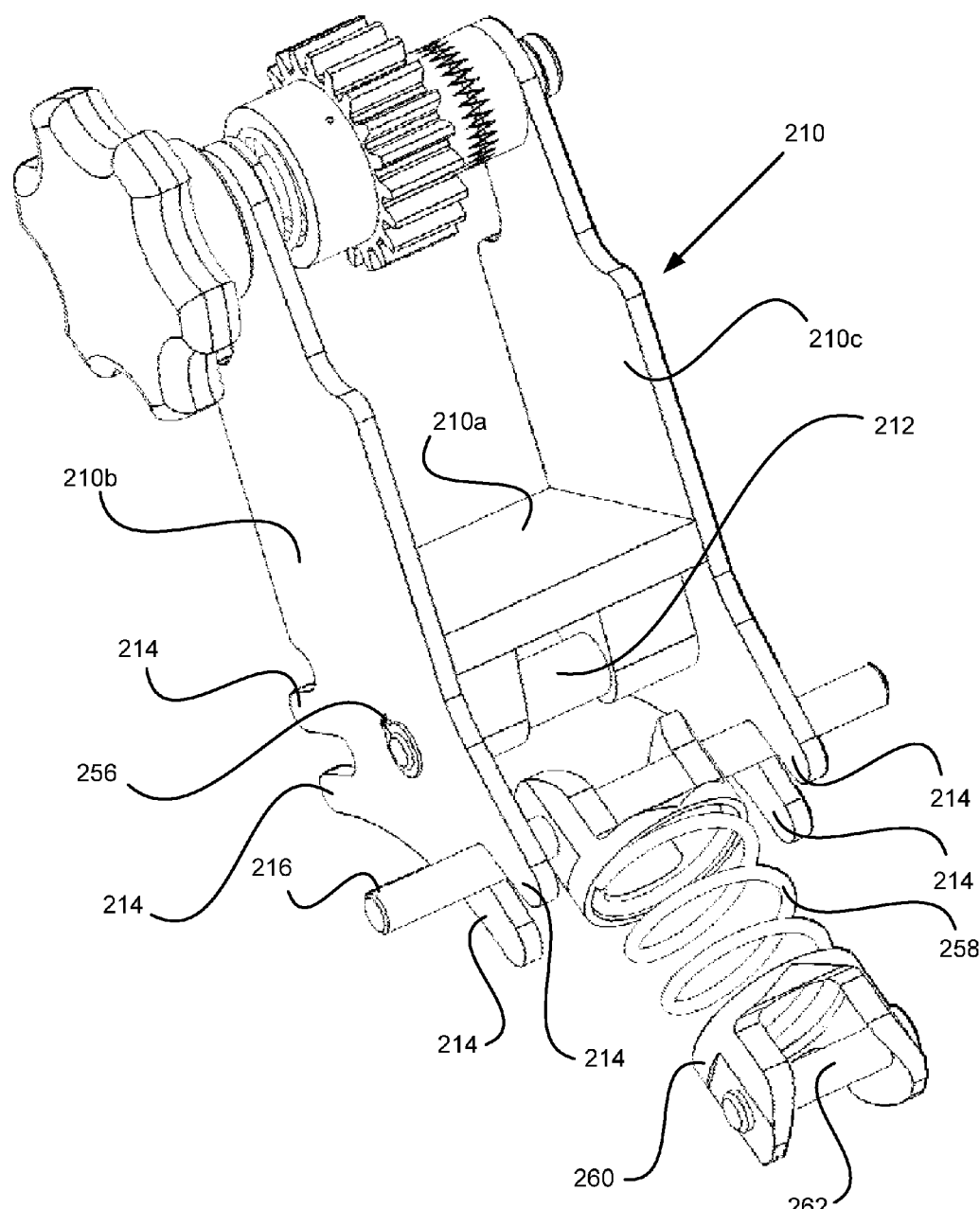
FIG. 6 is a perspective drawing illustrating an example of an H-bracket configured for being joined to the central body of FIG. 5.

Reference is now made to FIGS. 5 and 6. FIG. 5 is a perspective drawing illustrating an example of a central body of the supporting device, according to some embodiments of the present invention. FIG. 6 is a perspective drawing illustrating an example of an H-bracket configured for being joined to the central body of FIG. 5.

In FIG. 5, the main body 110 is in the form of a rod. The rod 110 has an upper end 110a, a lower end 110b, an upper aperture (mentioned above) 250, an elongated (intermediate) aperture 252 mentioned above, and a spring guide aperture 254. The rod 110 is configured for being joined to the grasping unit at the upper end 110a of the rod, and for being joined to the lower support unit at the lower end 110b of the rod. The upper aperture 250 is proximal to an upper end 110a of the rod 110. The elongated aperture 252 is located between the upper aperture 252 and the lower end 110b of the rod, and extends along the long axis of the rod. The spring guide aperture 254 is located between the elongated aperture 252 and the lower end 110b of the rod.

As can be seen in FIG. 6, the flange 210 is in the form of an H-bracket. the H-bracket 210 includes a base 210a flanked by a first side panel 210b and a second side panel 210c. The side panels 210a and 210b may have a cog-like shape, sporting teeth 214. Below the base 210a, the rotation pin 212 is fixedly joined to the H-bracket 210. For example, the rotation pin 212 may traverse the first and second side panels 210b and 210c of the H-bracket 210, and be fixedly joined to the first and second side panels via respective snap rings (of which the snap ring 256 is shown in FIG. 6). The rotation pin 212 is configured for traversing the upper aperture 250 of the rod 110, to join the H-bracket to the rod 110, while allowing rotation of the H-bracket with respect to the rod 110 around the rotation pin 212.

In order to stop the rotation between the H-bracket 210 and the rod 110 when the H-bracket is at a desired orientation with respect to the rod, a locking pin 216 is provided to traverse the elongated aperture 252 of the rod 110a and is held by desired pairs of the teeth 214 of the sides 210a and 210b of the H bracket.

In some embodiments of the present invention, the locking pin 216 is coupled to a spring 258, which is in turn coupled to the rod 110. The presence of the spring enables the adjustment of the H-bracket's orientation with respect to the rod, without removing the locking pin 216. More particularly, the spring 258 may be compressed to move the locking pin 216 inside the elongated aperture 252 away from the H-bracket, and out of the clasp of one or two pairs of teeth 214 (one pair on each of the H-bracket sides). Thus, the H-bracket may be rotated around the rotation pin 212, until a desired orientation is reached. The spring is then released, to move the locking pin toward the H-bracket, and between one or two desired pairs of teeth.

Optionally, the spring is joined to the rod 110 via a lower loop 260. The lower loop 260 is joined to a spring guide pin 262, which extends along the loop's plane. The lower loop 260 is configured for being traversed by the rod 110, and the spring guide pin 262 is configured for traversing the rod's spring guide aperture 254, thus fixing the loop (and therefore the lower end of the spring) to the rod 110. In a variant, the spring 258 is configured for being traversed by the rod 110 as well. In a variant, the locking pin 216 is joined to an upper loop 264, which surrounds the rod 110, and is movable along the rod 110.

It should be noted that the example of FIGS. 5 and 6 is only an example. It is conceivable that the spring may be need to be extended to disengage the lock supporting pin to enable the rotation of the H-bracket, and compressed for engaging the lock to stop the rotation of the H-bracket. In such a case the spring is joined to the rod at a location that is between the upper aperture and the elongated aperture. Thus, the supporting pin lock aperture may be between the upper aperture and the elongated aperture.

Figure 7:
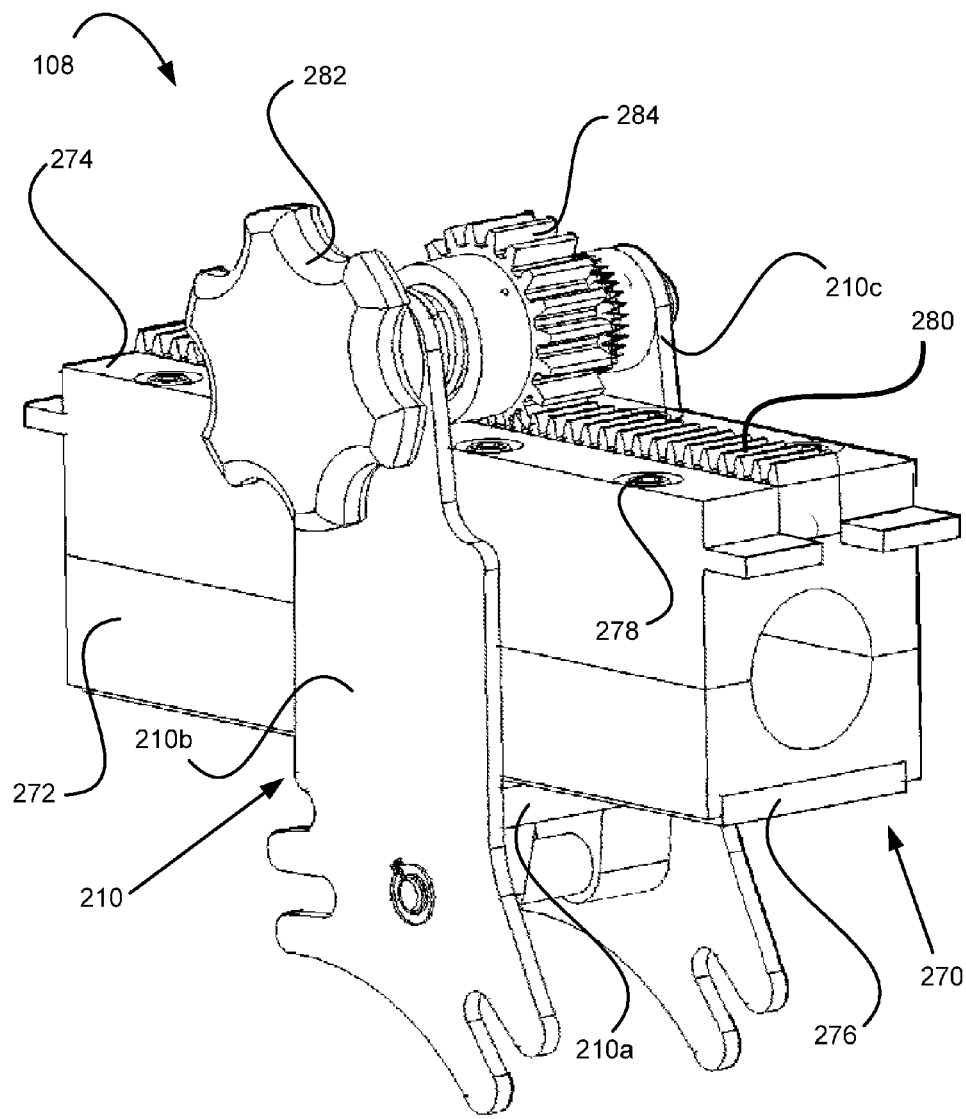
FIG. 7 is a perspective drawing illustrating an example of the grasping unit of the supporting device, according to some embodiments of the present invention.
Figure 8:
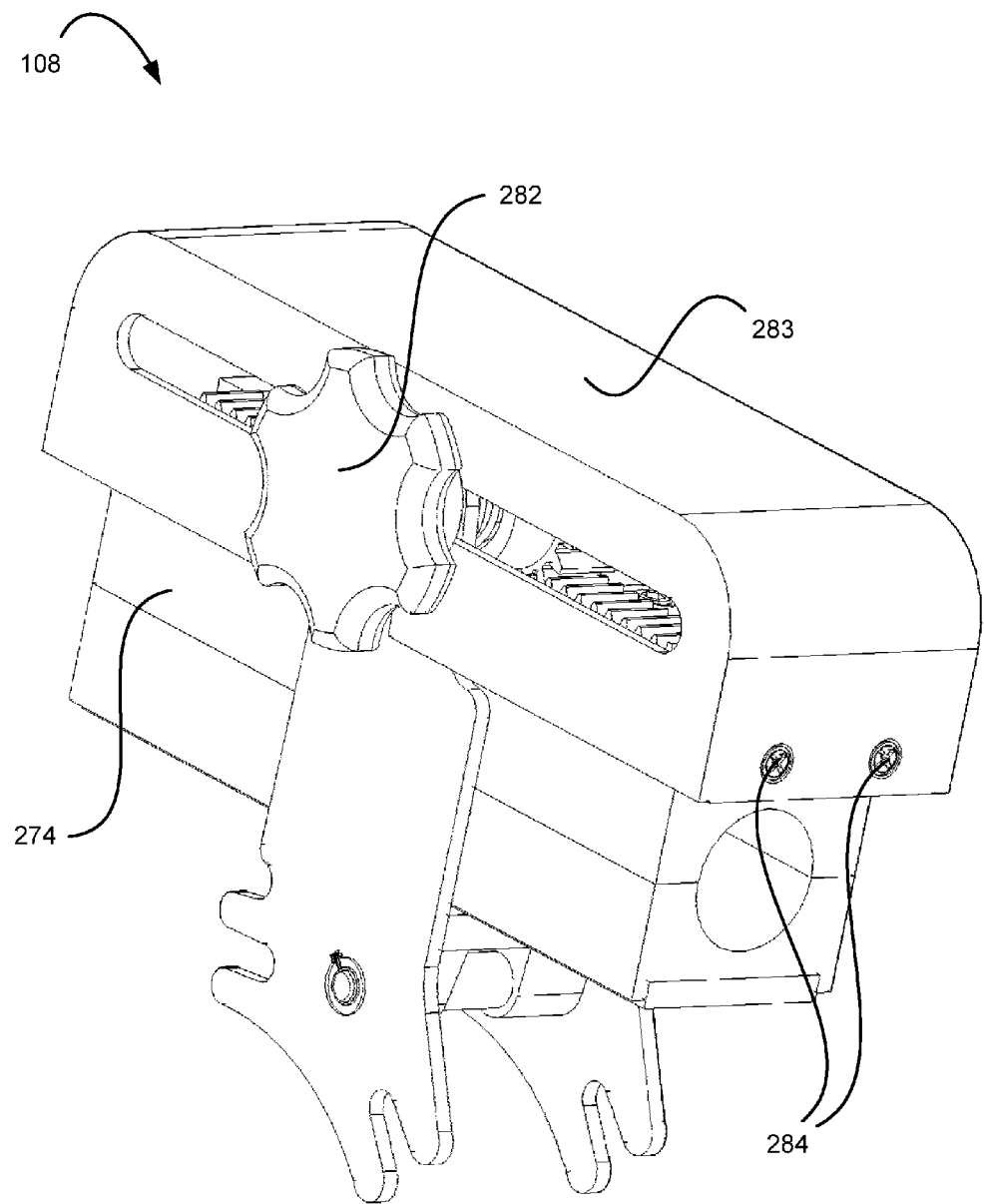
FIG. 8 is a perspective drawing illustrating the grasping unit of FIG. 7 partially covered by a cap.

Reference is now made to FIGS. 7 and 8. FIG. 7 is a perspective drawing illustrating an example of the grasping unit 108, according to some embodiments of the present invention. FIG. 8 is a perspective drawing illustrating the grasping unit 108 of FIG. 7 partially covered by a cap.

The grasping unit 108 includes the H-bracket 210, as described above, and a grasper 270. The grasper 270 includes a lower clamp side 272, an upper clamp side 274, a sliding pad 276, one or more retainers 278, and a rack 280.

The lower clamp side 272 and the upper clamp side 274 sport respective open channels. When the lower clamp side 272 and the upper clamp side are joined to each other, the open channels form a closed channel for surrounding and grasping the weed eater's shaft. The lower clamp side 272 and 274 are joined together by one or more retainers 278, such as screws. The retainers may be removed to detach the lower clamp side from the upper clamp side, allowing the placement of the weed eater's shaft between the upper and lower clamp sides. The upper and lower clamps sides are then joined together around the weed eater's shaft and locked together via the retainers, to form a friction clamp on the weed eater's shaft.

In some embodiments of the present invention, the lower clamp side 272 is placed on a sliding pad 276, enabling the lower clamp to slide (translate) along the sliding pad 276. The sliding pad 276 may extend substantially parallel to the rack. Optionally, the sliding pad 276 is partially recessed within the lower clamping side 272. In a variant, the rack 280 is fixedly joined to an upper surface of upper clamp 274, which will form a rack-and-pinion assembly with a gear, as will be shown later. The sliding pad may be made of polytetrafluoroethylene (PTFE), which is known to offers a decreased friction coefficient to solid materials. The lower clamp side may be made of metal.

The grasper 270 is held by the H-bracket 210. The sliding pad 276 is joined to the H-bracket's base 210a. In some embodiments of the present invention, the H-bracket is includes a pinion assembly, which includes a knob 282 joined to the first side panel 210b of the H-bracket, and configured for controlling the rotation of a gear 284. The gear 284 is located between the first side 210b and second side panel 210c of the H-bracket, coupled to the knob, and engages the teeth of the rack 280.

The gear 284 and the rack 280 form a rack-and-pinion assembly, which may be used for adjusting the location of the grasping unit 108 along the weed eater's shaft. When the gear 284 turns, the rack is pushed by the gear, thereby pushing the upper clamp side 274 to which the rack 280 is joined. The lower clamp side 272 is also subject to the force, since the lower clamps side is joined to the upper clamp side. The force applied on the clamp formed by the lower and upper clamp sides causes the clamp to slide along the sliding pad 276. In this manner, the clamp can be translated relative to the rod/main body described above. This enables the user to adjust the position of grasping unit along the weed eater's shaft clamped between the clamp sides.

Optionally, the grasping unit 108 includes a cap 285, as seen in FIG. 8. The cap 285 is joined to by one or more retainers (e.g., screws, bolts) 283 to the upper clamp side 274. The cap covers the rack-and-pinion assembly located on the upper clamp side 274 and between the sides of the H-bracket 210. Preferably, the cap 285 leaves the knob 282 uncovered, to ease access of a user to the knob. Optionally, the cap 285 is made of clear Plexiglas.

Figure 9:
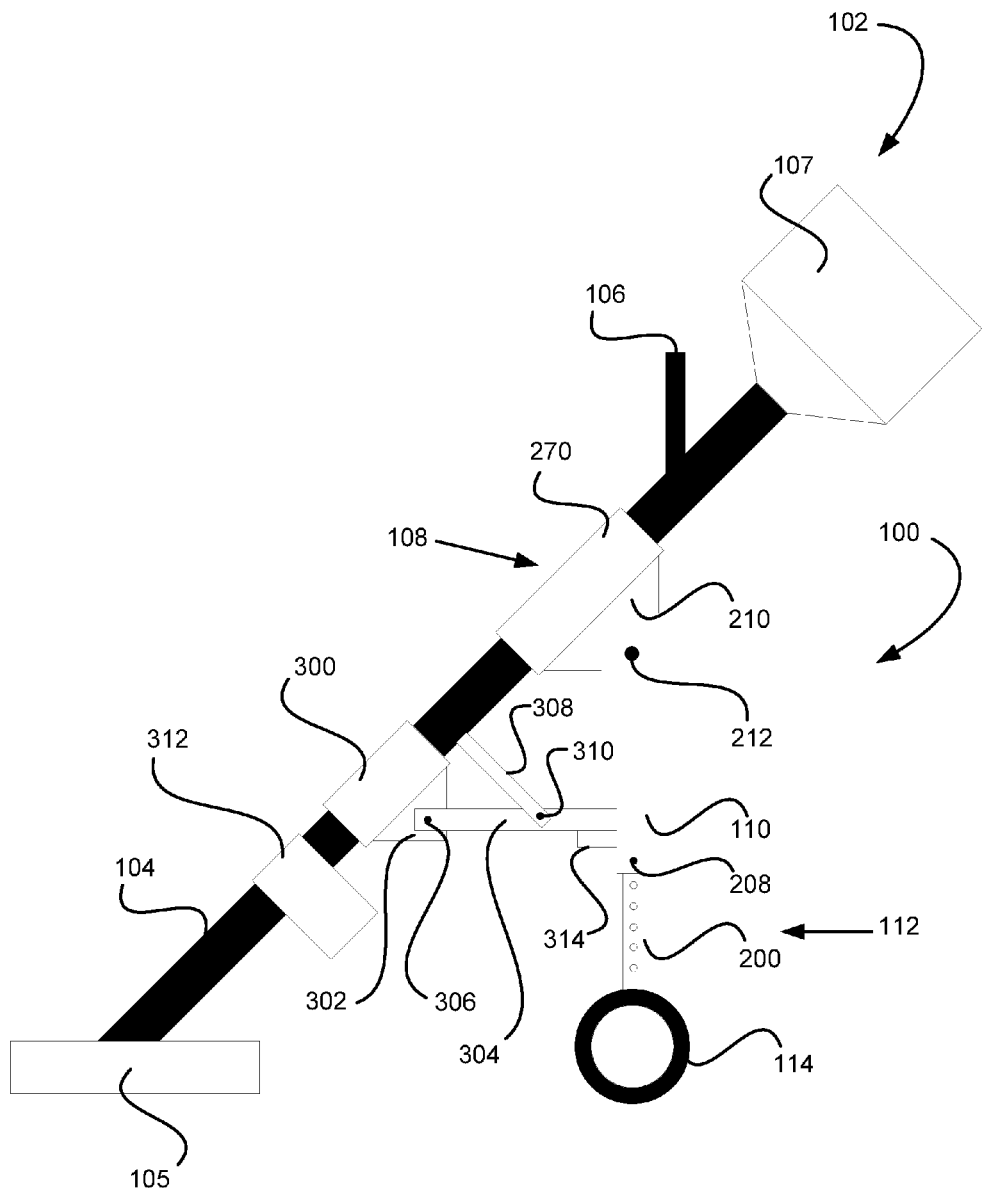
FIG. 9 is a side view of a device of some embodiments of the present invention in an open configuration thereof.
Figure 10:
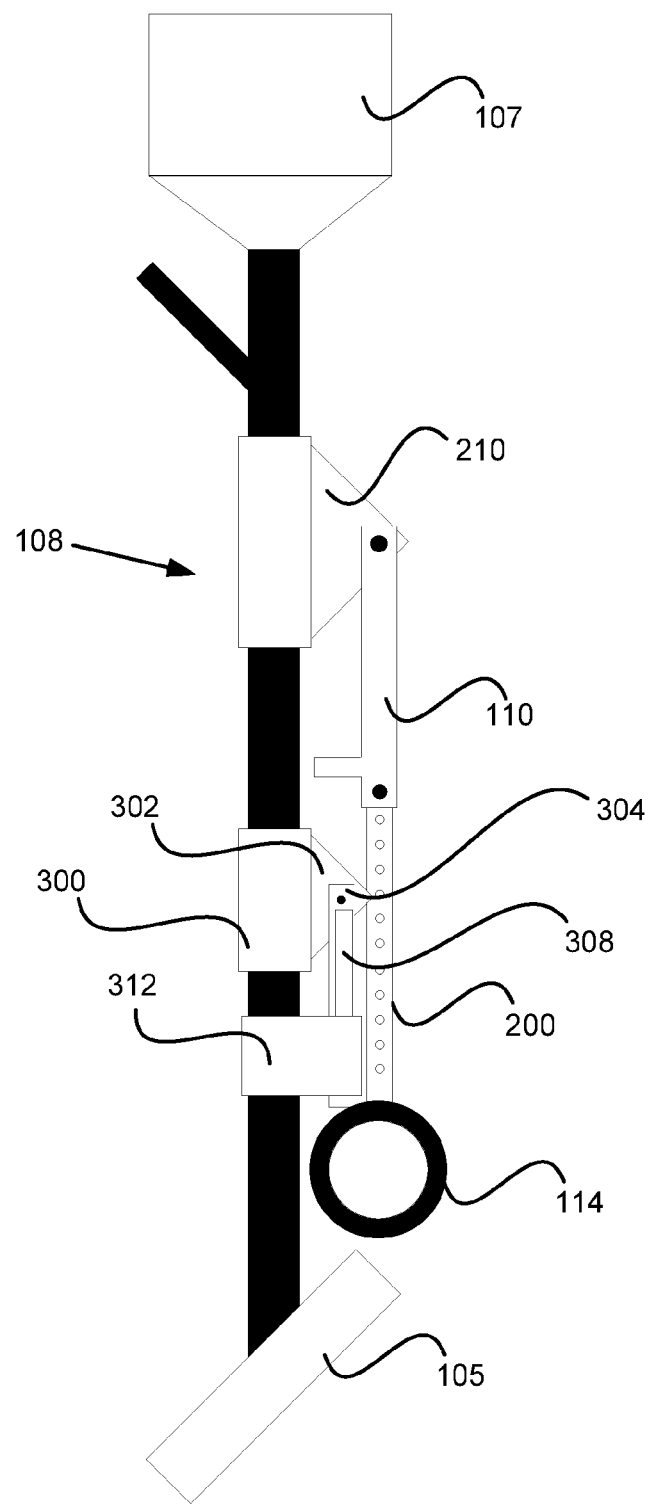
FIG. 10 is a side view of the device of FIG. 9 in a closed configuration thereof.

Reference is now made to FIGS. 9 and 10. FIG. 9 is a schematic drawing illustrating a side view of a device of some embodiments of the present invention in an open configuration thereof. FIG. 10 is a schematic drawing illustrating a side view of the device of FIG. 9 in a closed configuration thereof.

In the examples of FIGS. 9 and 10, the support device 100 has a lower support unit 112, which includes a support bracket 200 and one or more wheels 114, as described above. The support bracket 200 is joined to a first end of the central body 110, as described above. Optionally, the support bracket 200 and the central body 110 include apertures, and a may be locked together by a pin 208, when the one aperture of the support bracket 200 is aligned with one aperture of the central body 110, as explained above. The second end of the central body 110 is joined to a flange 210 of the grasping unit 108, via a rotation pin 212 which enables rotation of the central body 110 and the grasping unit 108 with respect to each other, as explained above.

In order to fix the positions of the central body 110 and the grasping unit 108 relative to each other, an example of a locking mechanism is provided. The locking mechanism includes a second grasper 300, a second flange 302, a clevis 304, a second rotation pin 306, and a hinge 308.

The second grasper 300 is configured for grasping the shaft 104 of the weed eater 102, for example, in the same manner as the first grasper 270 of the grasping unit 108. The second grasper 300 is positioned between the first grasper 270 and the blade 105 of the weed eater. The second flange 302 extends toward the main body 110 along a side of the second grasper 300, and is joined to the clevis 304 via the second rotation pin 306. In a variant, the second rotation pin is substantially parallel to the first rotation pin 212. The clevis 304 thus is rotatable about the second rotation pin 306, and in the open configuration of the device 100 is rotated to touch the main body 110 (FIG. 9). Optionally the main body 110 includes a protuberance 314 configured for coming into contact with the clevis 304 and stopping its downward rotation.

The hinge 308 is joined to the clevis 304 via a third rotation pin 310. In a variant, the third rotation pin is substantially parallel to the first rotation pin 212 In the open configuration of the device 100 (FIG. 9), the hinge 308 is rotated toward the shaft 104 and contacts the shaft 104 to prevent an upward (toward the shaft) rotation of the clevis 304. Thus, in the open configuration of the device 100, the clevis 304 cannot rotate downward, because of its contact with the main body 110, or upward, because of the hinge 308. Thus, the clevis 304 is locked and prevents the main body 110 from rotating toward the blade of the weed eater 102. Optionally, a structural element on the flange keeps the main body 110 from rotating backward (away from the blade and toward the motor of the weed eater 102). In this manner, the main body is also locked. Optionally, the sizes of the above described elements and the locations of the first and second graspers along the shaft are chosen so that an angle between the clevis 304 and the hinge 308 in the open configuration is a desired angle (for example, 45 degrees). As a consequence, the desired angle is also the angle between the shaft 104 and the ground.

In order to bring the device 100 to its closed configuration (FIG. 10), the hinge 308 is rotated to be substantially aligned with the clevis 304, and the clevis 304 is rotated toward the blade of the weed eater. This enables the central body 110 toward the blade of the weed eater. In the closed configuration, the central body 110, the clevis 304, and the hinge 308 are substantially parallel to the shaft 104. The closed configuration, therefore, may be used to decrease the space taken up by the assembly formed by the device 100 and the weed eater 102, and is convenient for storing the assembly.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A device for supporting a weed eater, the device comprising:
   a grasping unit, configured for grasping a shaft of the weed eater;
   a central body having an upper end and a lower end, the upper end being joined to the grasping unit;
   a lower support unit, joined to the lower end of the central body; and
   at least one wheel, joined to the lower support unit and configured for supporting the lower support unit;
   wherein the grasping unit is rotatable with respect to the central body, thereby changing an orientation of the grasping unit with respect to a ground upon which the device is located;
   wherein the grasping unit comprises a first grasper, for grasping the weed eater's shaft, and a flange joined to the first grasper and extending toward the central body;
   wherein the flange comprises a rotation pin configured for traversing an upper aperture on the central body, to enable rotation of the grasping unit with respect to the central body about the rotation pin;
   wherein:
      the flange has a cog-like shape with a plurality of teeth;
      the central body has an intermediate aperture located between the upper aperture and the central body's lower end, and aligned with the teeth of the flange; and
      the device comprises a locking support pin, configured for:
         being engaged to prevent rotation between the flange and the central body, by being inserted in the central body's intermediate aperture and extending out of the intermediate aperture to be caught between a desired pair of teeth of the flange; and
         being disengaged to enable rotation between the flange and the central body.

2. The device of claim 1, wherein the grasping unit is removably joinable to the shaft of the weed eater.

3. The device of claim 1, wherein at least a portion of the grasping unit is slidable along the shaft of the weed eater.

4. The device of claim 3, further comprising a locking mechanism configured for being engaged for preventing the at least one portion of the grasping unit from sliding along the shaft, and for being disengaged for enabling the at least one portion of the grasping unit to slide along the shaft.

5. The device of claim 1, wherein the lower support unit is translatable along the central body, thereby enabling adjustment of a height of the device.

6. The device of claim 1, wherein the lower support unit comprises:
   a support bracket joined to the lower end of the main central body; and
   a swivel caster joined to the at least one wheel, the swivel caster being configured for enabling a rotation of the at least one wheel around a rotation axis substantially perpendicular to a ground upon which the at least one wheel is located.

7. The device of claim 5, wherein the support bracket comprises a hollow tube, for receiving the central body's lower end, the central body being telescopically movable within the tube along the tube's central axis.

8. The device of claim 7, wherein:
   the hollow tube has at least one aperture arranged along a long axis of the hollow tube, and the central body as at least one aperture arranged along a long axis of the central body; and
   the device further comprises a pin usable for preventing translation of the central body with respect to the support bracket, by being inserted to traverse a desired aperture of the hollow tube and a desired aperture of the central body, when the desired aperture of the hollow tube and the desired aperture of the central body are aligned.

9. The device of claim 1, wherein:
   the central body is in a form of a rod extending from the central body's lower end to the central body's upper end;
   the intermediate aperture has an elongated shape, traverses the rod around an axis perpendicular to a long axis of the rod, extends along the long axis of the rod, and is traversed by the lock supporting pin;
   the device comprises a spring joined to the rod and to the locking support pin, such that a compression or extension of the spring moves the locking support pin within the elongated aperture along the rod's long axis.

10. A device for supporting a weed eater, the device comprising:
    a grasping unit, configured for grasping a shaft of the weed eater;
    a central body having an upper hand and a lower end, the upper end being joined to the grasping unit;
    a lower support unit, joined to the lower end of the central body; and
    at least one wheel, joined to the lower support unit and configured for supporting the lower support unit;
    wherein the grasping unit is rotatable with respect to the central body, thereby changing an orientation of the grasping unit with respect to a ground upon which the device is located;
    wherein the grasping unit comprises a first grasper, for grasping the weed eater's shaft, and a flange joined to the first grasper and extending toward the central body;
    wherein the flange is an H-bracket comprising:
       a base; and
       two side panels flanking the base and facing each other;
    wherein the first grasper is held on the base between the H-bracket's sides, and comprises:
    a clamp comprising a lower clamp side and an upper clamp side, the upper and lower clamp side being configured to be joined for grasping the weed eater's shaft;
    a rack located on an upper surface of the upper clamp side;
    a sliding pad, joined to the base of the H-bracket and extending parallel to the rack;
    the lower clamp side being joined to the sliding pad, and translatable along the sliding pad in a direction parallel to a long axis of the weed eater's shaft.

11. The device of claim 10, wherein the H-bracket comprises:
    a gear engaging the first grasper's rack to form a rack-and-pinion assembly, the gear being located between the side panels of the H-bracket; and
    a cog joined to the gear, and configured for controlling a rotation of the gear;
    wherein the rotation of the gear causes the rack to move, thereby moving the clamp along the sliding pad.

12. A device for supporting a weed eater, the device comprising:
    a grasping unit, configured for grasping a shaft of the weed eater;
    a central body having an upper hand and a lower end, the upper end being joined to the grasping unit;
    a lower support unit, joined to the lower end of the central body; and
    at least one wheel, joined to the lower support unit and configured for supporting the lower support unit;

wherein the grasping unit is rotatable with respect to the central body, thereby changing an orientation of the grasping unit with respect to a ground upon which the device is located;

wherein the grasping unit comprises a first grasper, for grasping the weed eater's shaft, and a flange joined to the first grasper and extending toward the central body;

the device for supporting a weed eater, further comprising:

a second grasper, configured for grasping the weed eater's shaft between the first grasper and the weed eater's blade;

a second flange extending toward the central body along a side of the second grasper;

a clevis joined to the second flange via a second rotation pin, and being rotatable with respect to the second flange about the second rotation pin, such that in an open mode of the device the clevis touches the central body to prevent the central body from rotating with respect to the shaft, and in a closed mode of the device the clevis is substantially parallel to the weed eater's shaft; and a hinge joined to the clevis via third rotation pin and rotatable with respect to the clevis, such that in an open mode of the device the clevis touches the weed eater's shaft to prevent the clevis from rotating toward the shaft, while in a closed mode of the device, the hinge is substantially parallel to the weed eater's shaft.

13. The device of claim 12, wherein the flange comprises a rotation pin configured for traversing an upper aperture on the central body, to enable rotation of the grasping unit with respect to the central body about the rotation pin, and the second rotation pin and the third rotation pin are parallel the rotation pin.

* * * * *